R. H. MARTENS.
SAWING MACHINE.
APPLICATION FILED FEB. 28, 1910.
1,014,500.
Patented Jan. 9, 1912.
2 SHEETS—SHEET 1.
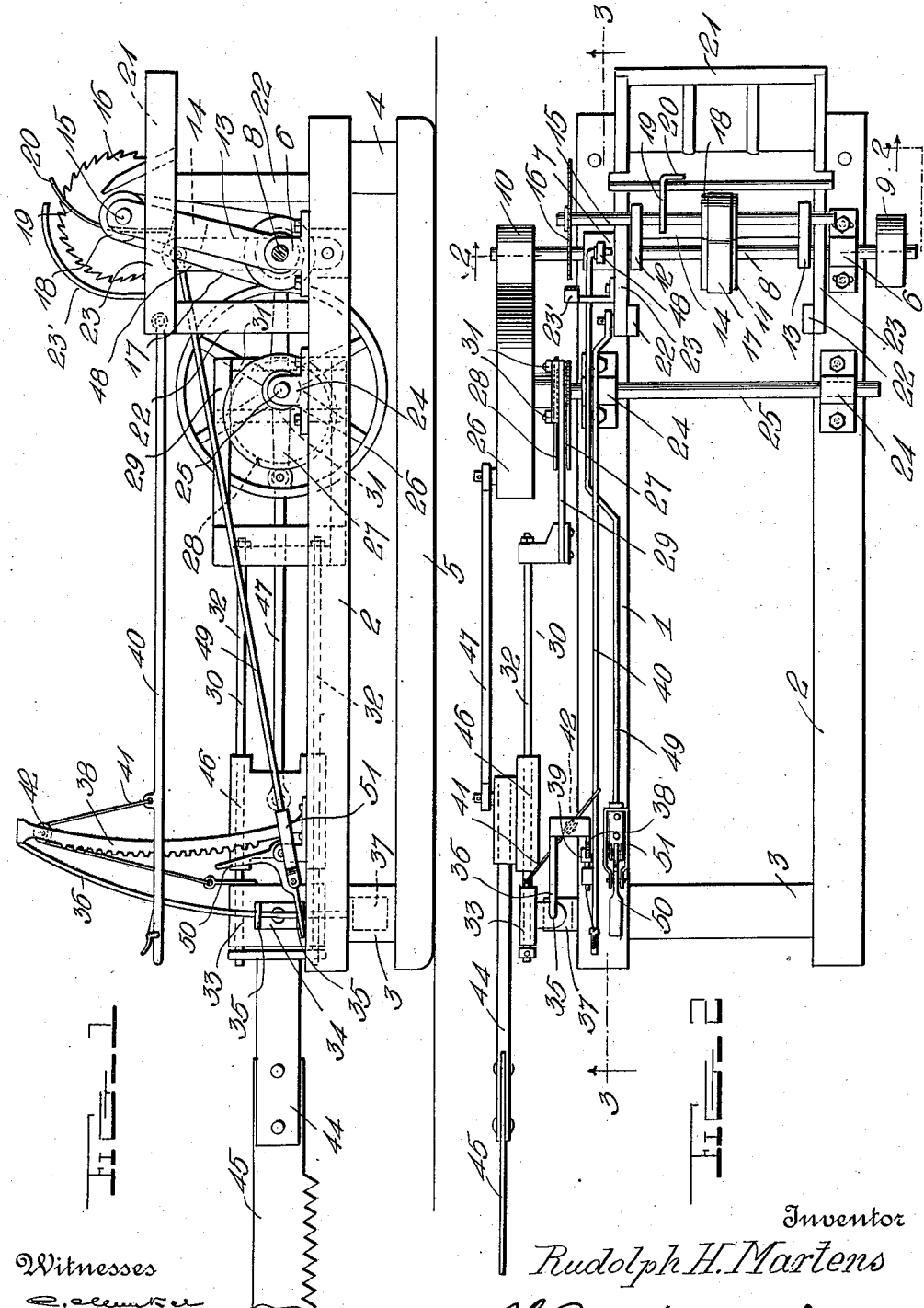
Witnesses
C. H. Griesbauer
Inventor
Rudolph H. Martens
by H. B. Willson & Co.
Attorneys

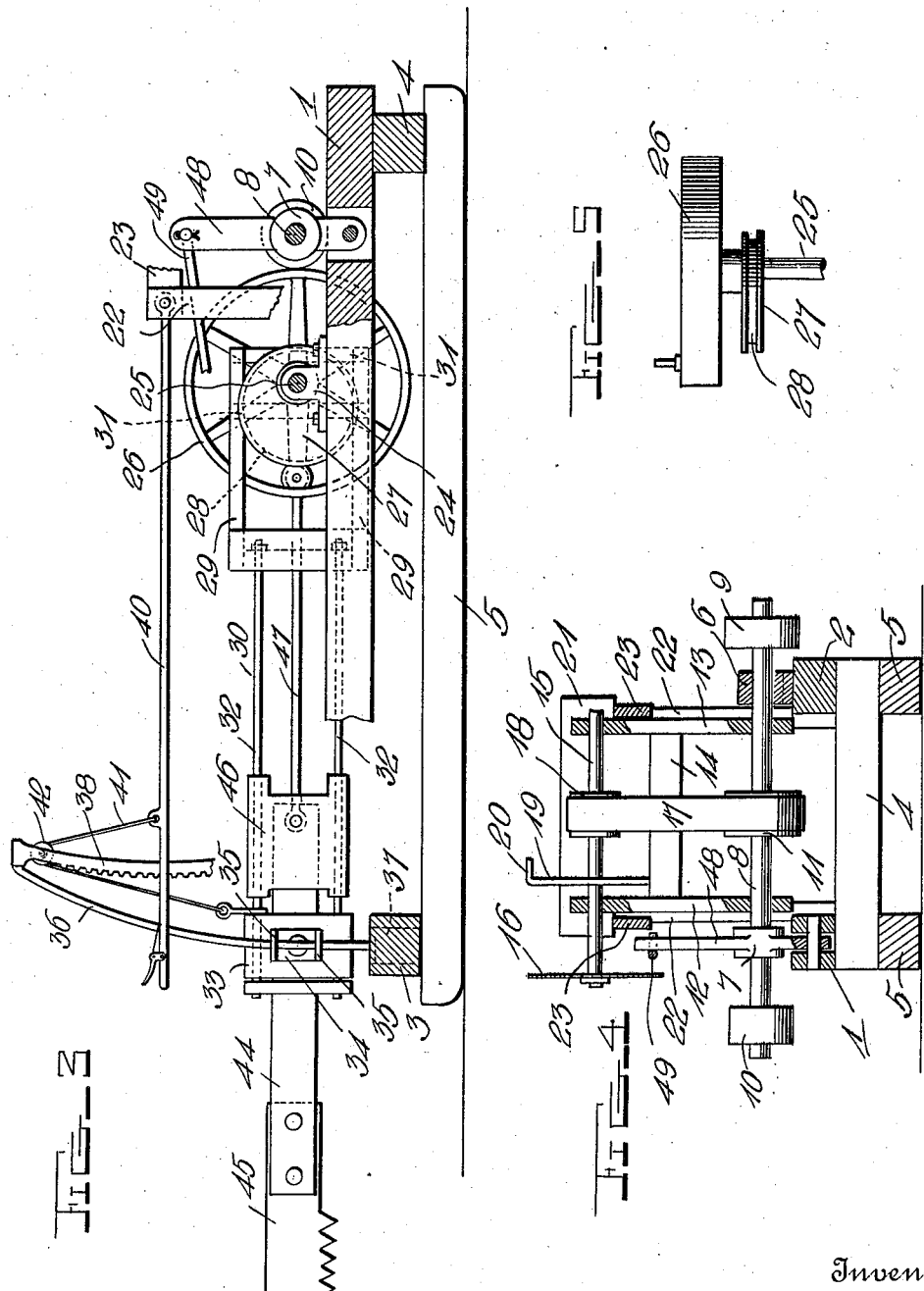

UNITED STATES PATENT OFFICE.

RUDOLPH H. MARTENS, OF FAIRFIELD, WASHINGTON.

SAWING-MACHINE.

1,014,500. Specification of Letters Patent. Patented Jan. 9, 1912.

Application filed February 28, 1910. Serial No. 546,502.

*To all whom it may concern:*

Be it known that I, RUDOLPH H. MARTENS, a citizen of the United States, residing at Fairfield, in the county of Spokane and State of Washington, have invented certain new and useful Improvements in Sawing-Machines; and I do declare the following to be a full, clear, and exact description of the invention, such as will enable others skilled in the art to which it appertains to make and use the same.

This invention relates to improvements in sawing machines.

One object of the invention is to provide a novel mechanism whereby the saw will be operated in such a manner that the sawdust will be cleaned from the cut.

The invention also seeks to provide novel means for supporting and adjusting the drag saw.

With the foregoing and other objects in view, the invention consists of certain novel features of construction, combination and arrangement of parts as will be more fully described and particularly pointed out in the appended claims.

In the accompanying drawings, Figure 1 is a side view of one side of a sawing machine constructed in accordance with the invention; Fig. 2 is a top plan view of the same; Fig. 3 is a vertical longitudinal section on the line 3—3 of Fig. 2; Fig. 4 is a vertical cross section on the line 2—2 of Fig. 2; Fig. 5 is a detail view of the drag saw operating mechanism.

In the embodiment illustrated, I have shown the frame side members, 1 and 2, resting upon the cross beams 3 and 4 carried by the runners 5. Secured adjacent the cross beam 4 on the frame side member 2 is a bearing box 6, which is pivoted to have a slight transverse movement, and on the opposite supporting beam 1 is pivoted a bearing 7 to have a longitudinal movement.

Journaled in the bearings 6 and 7 is a power shaft 8 having secured to one end thereof the driving pulley 9, and the driving pulley 10 at the opposite end thereof, and intermediate the supporting bars 1 and 2 another driving pulley 11.

Loosely mounted on the shaft between the bearings 6 and 7 is a pair of vertical supporting arms 12 and 13, which are connected adjacent their upper ends by a cross beam 14, and have journaled in their upper ends above the cross beam the circular saw shaft 15, upon which is carried the circular saw 16. This shaft is driven by a belt 17 running over the pulley 11, and a pulley 18 carried upon the saw shaft 15. A lever 19 projects upwardly from the cross beam 14, and is provided at its upper end with a handle 20 adapted to be grasped by the operator to throw the frame forward into position to have the saw act upon the material carried by the work table. This work table 21 is supported upon four uprights 22, which project upwardly from the supporting bars 1 and 2 and on opposite sides of the bearings 6 and 7 and are connected together by longitudinal pieces 23.

As will be seen in Fig. 2, the forward uprights 22 limit the forward movement of the arms 12 and 13, and the rear uprights 22 limit its rearward movement, the circular saw frame moving between the longitudinal pieces 23. Over the inner side of the circular saw 16 is arranged a suitable guard 23' which will prevent the saw from injuring the operator.

Journaled in the bearings 24 on the side members 1 and 2 of the frame is a shaft 25 on the outer end of which is fixedly mounted a friction pulley 26 adapted to be engaged by the pulley 10 in the manner hereinafter described. This pulley 26 has arranged upon its inner face a cam wheel or eccentric 27, the periphery of which is grooved as at 28 to receive the upper and lower parallel bars 29 of a saw head guiding and rocking frame 30. The frame 30 has secured thereto transverse limiting bars 31 arranged on opposite sides of the shaft 25, as shown. Connected to the inner end of the frame 30 is a pair of parallel, forwardly projecting guide bars or rods 32, which are connected at their outer ends to a pivot plate 33, upon which is pivoted a guide member 34 having parallel, laterally projecting apertured ears or lugs 35, which are slidably engaged with an upwardly projecting guide bar 36 secured at its lower end to the frame work of the machine by a bracket or other support 37. The guide bar 36 is formed on the arc of a circle concentric with the shaft 25 on which the drive pulley 26 and cam wheel 27 are mounted. The guide bar 36 is suitably braced and has connected thereto a segmental rack 38, which is adapted to be engaged by a pawl 39 carried by and operated on a saw raising and lowering lever 40, one end of which is pivotally mounted on the work table or frame of the circular saw as shown. The lever 40 is connected to the pivot plate 33 of the saw head by a rope or other flexible connection 41, which passes over a pulley 42 arranged on the upper end of the guide bar 36, as shown. By thus connecting the lever 40 with the pivot plate of the saw head, the latter and the saw may be raised and lowered and supported at any desired elevation. The head 44 of the drag saw 45 is connected at its inner end to a guide plate 46, which is slidably engaged with or mounted on the guide rods 32 connected to the rocking frame 30 of the saw. To the guide plate 46 is pivotally connected the forward end of a pitman rod 47, the opposite end of which is pivotally connected with a wrist pin on the friction pulley 26, whereby the movement of said pulley will impart a reciprocating movement to the saw head and saw, said head and saw being at the same time rocked on the guide plate 34 by means of the cam wheel 27 and rocking frame 30, which are connected to the saw head by the guide bars 32, and guide plate 46, thereby imparting to the saw a movement similar to that described in hand sawing.

Extending upwardly from the pivoted bearing 7 is an operating arm or lever 48 to which is connected the locking rod 49 operated by a locking lever 50. This locking lever is pivoted to the side member 1 of the frame and has pivotally connected thereto a bifurcated connecting yoke 51, the inner end of which is connected to the locking rod 49, whereby said rod is operatively connected to the lever, so that, when the latter is swung in one direction, the pivotal connection of the outer end of the yoke 51 will be brought below the pivotal connection of the lever with the frame of the machine, thereby locking the lever in an operative position for holding the locking rod. When the locking rod has thus been pulled forwardly and locked by the lever, the pulley 10 will be drawn and held into operative engagement with the friction pulley 26, thus imparting the motion of the drive shaft 8 to the pulley and through the latter and the pitman rod 47 to the saw 45. The cam wheel 27 imparts a rocking movement to the drag saw in addition to the reciprocating movement imparted thereto by the crank wheel 26, so that the sawdust is cleared from the cut and is not left therein to clog the action of the saw.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:—

1. In a sawing machine, the combination of a supporting frame, a main drive shaft mounted therein, a guide bar arranged on said frame, a pivot plate slidably mounted on said bar, a rocking frame connected at one end to said pivot plate, a drag saw having a sliding connection with said rocking frame, a drag saw operating pulley, a pitman connecting said pulley with the saw, and means operated by the pulley to actuate said rocking frame, whereby the saw will be oscillated simultaneously with its reciprocation.

2. The combination of a main frame, a shaft thereon, a crank wheel on said shaft, a cam on said shaft adjacent the crank wheel, a rocking frame having one end mounted on the main frame and its opposite end bearing on the cam, a slide mounted on the rocking frame, a saw secured to said slide, and a pitman connecting the crank wheel to the saw.

In testimony whereof I have hereunto set my hand in presence of two subscribing witnesses.

RUDOLPH H. MARTENS.

Witnesses:
L. M. COLLINS,
ELSIE M. LOWE.

---

Copies of this patent may be obtained for five cents each, by addressing the "Commissioner of Patents, Washington, D. C."